July 30, 1935.  N. B. HENRY  2,009,658
BALE BREAKER
Filed March 28, 1934  2 Sheets-Sheet 1
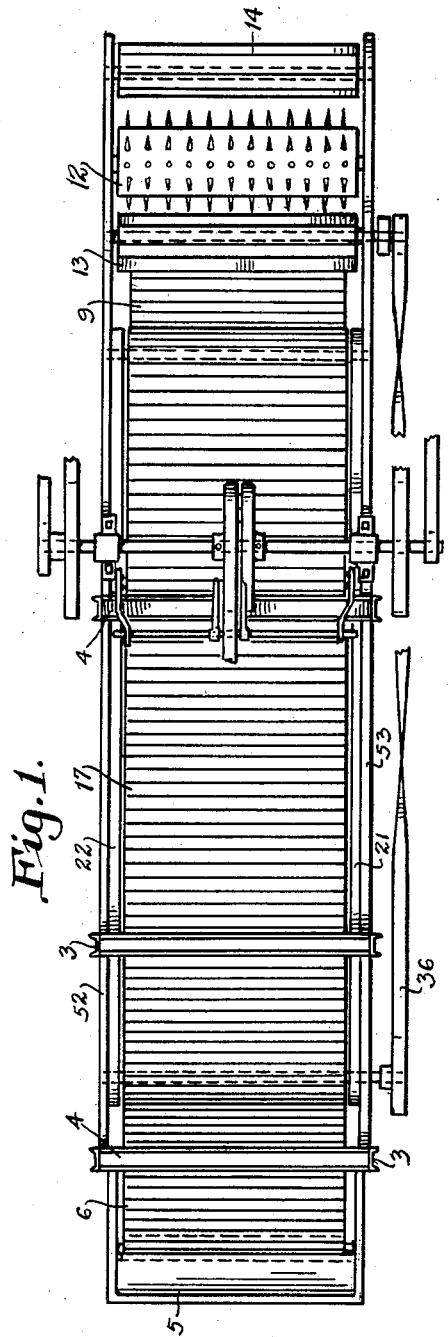
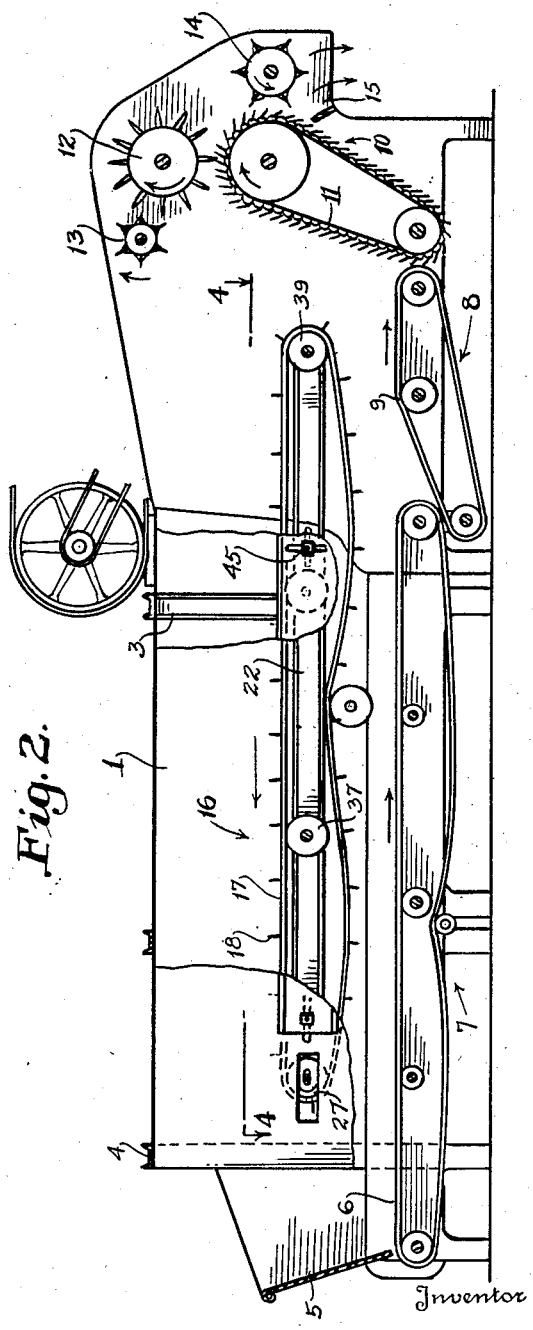
Inventor
NELSON B. HENRY
By Mason Fenwick & Lawrence
Attorneys July 30, 1935.  N. B. HENRY  2,009,658
BALE BREAKER
Filed March 28, 1934  2 Sheets-Sheet 2
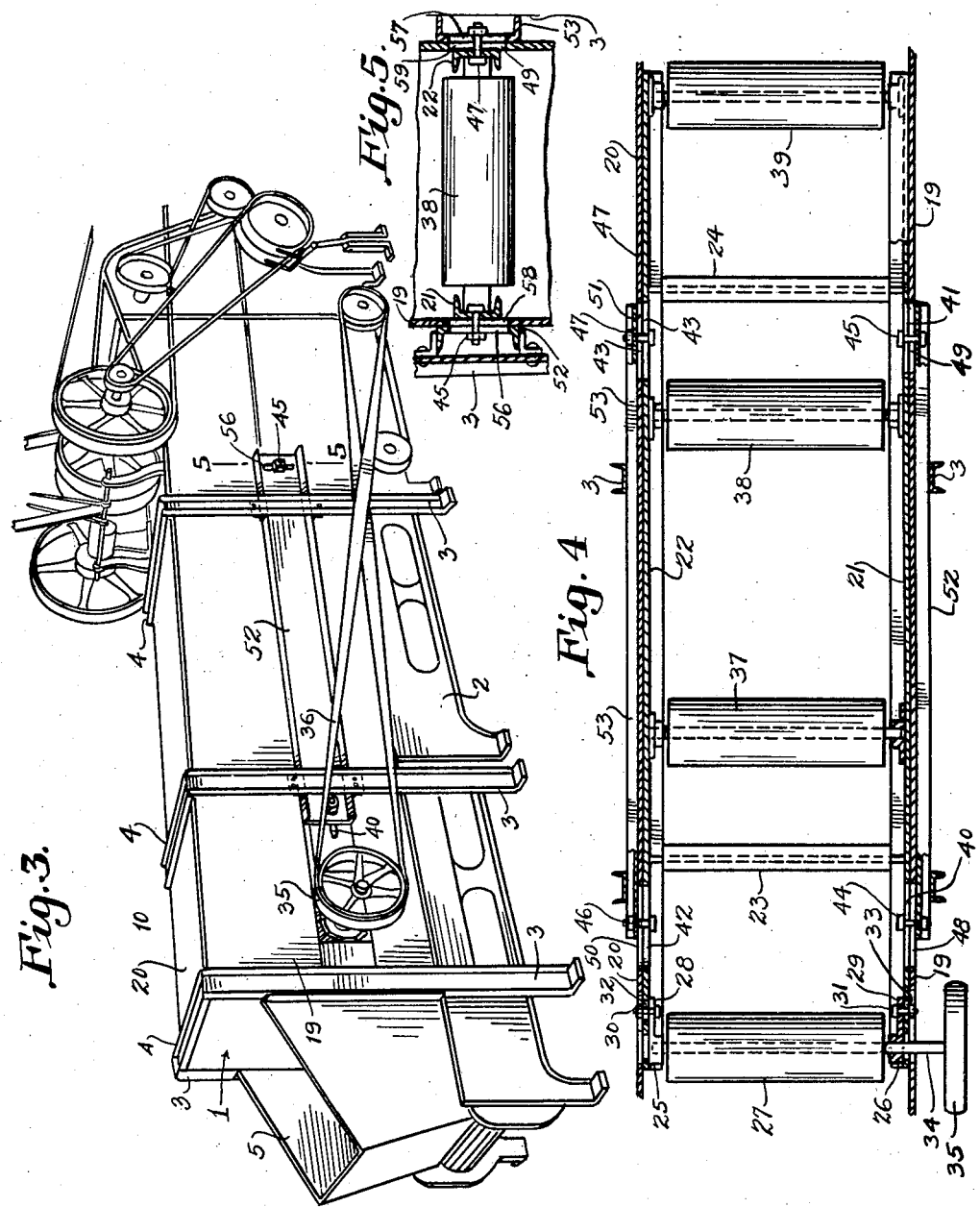
Inventor
NELSON B. HENRY Patented July 30, 1935

2,009,658

UNITED STATES PATENT OFFICE 2,009,658

BALE BREAKER

Nelson B. Henry, Columbus, Ga.

Application March 28, 1934, Serial No. 717,832

4 Claims. (Cl. 19—79)

The invention forming the subject matter of this application is a bale breaker adapted for use in separating the fibers of and in mixing cotton obtained from any number of different bales so as to obtain an average quality, in the finished product, from bales of different qualities.

In bale breakers in common use, it is usual to feed cotton from different bales along a horizontal endless conveyor toward a spiked inclined endless lifting conveyor or apron, which separates small tufts or portions from the comparatively large mass of cotton presented to it. As the volume of cotton presented to the lifting apron increases, it assumes a cylindrical form, rotating in a compact mass against the lifting apron. When this volume exceeds a predetermined maximum, the rotating mass operates a lever to stop the horizontal conveyor until such time as the lifting apron shall have removed sufficient cotton from the cylindrical mass to warrant resumption of operation of the horizontal feed conveyor.

This alternate stopping and starting of the feed conveyor slows down the mixing and separating functions of the machine. Furthermore, the packing of the cotton against the spiked lifting apron forces the spikes thereof to tear the cotton bit by bit from the densely packed cylindrical roll; and this tearing naturally tends to bruise, and even break, some of the delicate cotton fibers.

It is the main object of the present invention to provide a bale breaker which presents the cotton continuously to the lifting apron in a comparatively loose mass, and thereby eliminate damage to the cotton fibers.

Another object of the invention is to provide a machine of this type in which the formation of a compact mass of cotton against the lifting apron is eliminated; and, in which the cotton not removed by this apron is returned to the inlet end of the feed hopper to be mixed again with the cotton being introduced manually.

Other objects of the invention will become apparent as the detailed description thereof proceeds.

In the drawings:

Figure 1 is a top plan view of a bale breaker constructed in accordance with the present invention;

Figure 2 is a side elevation, with parts broken away to show details of construction;

Figure 3 is a perspective view of the bale breaker;

Figure 4 is a horizontal transverse section taken on the line 4—4 of Figure 2; and Figure 5 is a fragmentary vertical section taken on the line 5—5 of Figure 3.

As shown in the drawings, the bale breaker comprises a hopper 1 suitably supported by framework including a base 2 and standards 3, connected at their upper end by transverse members 4. A feed chute 5 at one end of the hopper 1 leads to one end of the upper branch 6 of a horizontal endless feed conveyor or apron designated generally by the reference numeral 7. The other end of the branch 6 is arranged above one end of what is commonly known in this art as a bottom apron 8, which is also constructed as an endless conveyor having its upper branch 9 moving in the same general direction as the upper branch 6 of the feed apron 7.

The other end of the bottom apron 8 is arranged adjacent to a spiked lifting apron 10 having a branch 11 moving in an upward direction slightly inclined away from the upper face of the branch 9 of the bottom apron 8.

A spiked stripper roller 12 is rotatably mounted at the upper end of the lifting apron to remove therefrom any large masses of cotton which might adhere to the spikes of the lifting apron, and to throw the removed masses back into the feed hopper. A doffer roller 13 rotatably mounted adjacent the spiked stripper roller removes any large masses of cotton adhering thereto; and a doffer roller 14, rotatably mounted in the framework of the bale breaker, removes the small tufts of cotton from the lifting apron 11 and passes them through the outlet 15 of the machine.

As so far described, the arrangement of elements is quite similar to corresponding elements in bale breakers in common use. In the present invention, however, the automatic stop mechanism of the prior art, to control the operation of the feed apron, is eliminated; as the bale breaker disclosed herein is intended to be continuously operated. In this machine, the cotton not removed by the lifting apron 11 from the mass fed to it along the aprons 7 and 8, is thrown back by the spiked roller 12, and the doffer roll 13, onto an endless conveyor or apron 16 mounted in the hopper 1 so that its upper branch 17 moves in a direction opposite to the direction of movement of the branches 6 and 9 of the aprons 7 and 8. While not absolutely necessary, it is preferable that the slats of the conveyor 16 be provided with spikes 18 to facilitate the return of the cotton on the conveyor 16 toward the inlet end of the hopper.

The conveyor 16 has its moving elements supported by a frame which is adjustably mounted between the side walls 19 and 20 of the hopper 1. This frame comprises channel-iron runners 21 and 22, suitably secured to each other by the transverse T-irons 23 and 24, to form a substantially rectangular framework in which are journaled the various rollers for the endless conveyor apron 16. At one end of the framework, the journal bearings 25 and 26 for the drive roller 27 are slidably mounted, and are adapted to be secured in adjusted position in the channel irons 21 and 22 by means of the bearing extensions 28 and 29, which are provided with apertures to receive bolts 30 and 31 extending through slots 32 and 33 formed in the webs of the channel irons 21 and 22.

The roller 27 is fixed to a drive shaft 34 extending through a suitable opening in the side wall 19 of the hopper 1, and having fixed thereto a pulley 35 adapted to be rotated by a belt 36 connected at its other end to one of the driving pulleys of the machine. Idler rollers 37, 38, and 39 for supporting the apron 16 are suitably journaled in bearings spaced apart along and secured to the channel irons 21 and 22.

The apron 16 is of substantially the same length as the apron 7 and may be adjusted bodily, by means of its supporting framework, toward and from the lifting apron 11. For this purpose, the channel irons 21 and 22 are provided with slots 40, 41, 42 and 43 through which pass the shanks of bolts 44, 45, 46 and 47. The side walls 19 and 20 of the hopper 1 are provided with slots 48, 49, 50 and 51 registering with the slots 40, 41, 42, and 43, respectively. Reinforcing channel irons 52 and 53, are suitably secured to the sides 19 and 20 of the hopper 1; and are provided at one end with the apertures to receive the shanks of bolts 44 and 46. The other ends of these channel irons are provided with vertically extending slots 56 and 57 to receive slidably the shanks of bolts 45 and 47, and the sides 19 and 20 of the hopper 1 are provided with slots 58 and 59 registering with slots 56 and 57, respectively.

It will be obvious from the disclosure, so far, that the supporting framework of the apron 16 may be adjusted bodily toward and from the lifting apron 11; and that this adjustment is limited in either direction only by the length of the bolt receiving slots, 40, 41, 42 and 43. This frame may also be adjusted angularly about the common axis of bolts 44 and 46, and may be locked in angularly adjusted position by means of the bolts 45 and 47.

In the operation of this bale breaker, layers or slabs of cotton from different bales are placed by hand, through the chute 5, on the upper branch of the conveyor 7 continuously moving toward the bottom apron 8, which in turn, is in continuous movement toward the spiked lifting apron 10. Only the small tufts adhering to the spikes of the lifting apron are allowed to pass between this apron and the stripper roller 12, to be removed by the doffing roller 14 for discharge through the outlet 15. The larger tufts or portions of cotton are thrown by the spiked roller 12 and the doffing roller 13 onto the return apron 16. There is, therefore, a continuous circulation of the cotton. By reason of this construction, there is a comparatively large amount of cotton in the bale breaker and a very superior mixing of the cotton is obtained, since cotton from a large number of different bales may be continuously introduced into the breaker and continuously circulated on the several endless conveyors, toward and from the spiked lifting apron.

It will be understood, of course, that the new cotton will be fed to the bale breaker as required to maintain the total in circulation more or less constant. In actual practice it has been found that even when the feed and return conveyors 7 and 16 are comparatively short (as for example when there is only about twelve feet between the centers of the end rollers in each conveyor) there will be about five or six times as much cotton in the breaker as can be taken care of effectively in the bale breaker of the older type.

In actual practice, it is found convenient to run all the conveyors at the same rate. This means, of course, that a single endless conveyor could be substituted for the conveyors 7 and 8. However, it may in some cases, be found advisable to operate the bottom apron 8 at a higher speed than the other apron, in order to increase the movement of the cotton nearest to the spiked lifting apron 10.

It will be evident that in a bale breaker of this type, the cotton is presented to the lifting apron in a loose and less compact condition than would be the case if the cotton were continuously rotating, as in the old type of bale breaker, in a compact cylindrical mass in constant contact with the spikes of the lifting apron. As a matter of fact, the spikes of the lifting apron can only engage such loosened portions of cotton as can be removed with the least effort from the mass of cotton presented to it. This mode of operation obviously reduces the likelihood of damage to the cotton fiber. The compact layers or slabs of cotton taken from the different bales, are repeatedly brought into contact with the spiked lifting apron in their cycles of movement, and by their repeated impact with the spiked stripper roller and doffer, have ample opportunity to be opened up and separated as the loosened portions are being removed.

While I have shown and described the preferred embodiment of my invention, it is to be understood that I do not limit myself to the precise construction herein disclosed and the right is reserved to all changes and modifications coming within the scope of the invention as defined in the appended claims.

What I claim is:

1. A cotton bale breaker comprising a casing having an inlet and an outlet, a lifting apron movable in said casing adjacent said outlet, mechanism for conveying slabs of cotton in a substantially horizontal plane from said inlet into contact with the said apron, a stripper roller at the upper end of said lifting apron, a frame slidably and angularly adjustable in said casing above said mechanism, means movably mounted on said frame for returning to the inlet end of said mechanism the slabs of cotton removed from said apron by the stripper roller, and means for locking said frame in adjusted position in said casing.

2. A cotton bale breaker comprising a casing having an inlet and an outlet, a lifting apron movable in said casing adjacent said outlet, mechanism for conveying slabs of cotton in a substantially horizontal plane from said inlet into contact with the said apron, a stripper roller at the upper end of said lifting apron, a frame having an endless conveyor mounted thereon to return to said mechanism slabs of cotton removed from said apron by said stripper roller, and means for mounting said frame on said casing for bodily adjustment toward and from said apron.

3. A cotton bale breaker comprising a casing having an inlet and an outlet, a lifting apron movable in said casing adjacent said outlet, mechanism for conveying slabs of cotton in a substantially horizontal plane from said inlet into contact with the said apron, a stripper roller at the upper end of said lifting apron, a frame having an endless conveyor mounted thereon to return to said mechanism slabs of cotton removed from said apron by said stripper roller, and means for mounting said frame for bodily adjustment toward and from said apron and for angular adjustment relative to said mechanism.

4. A cotton bale breaker comprising a casing having an inlet and an outlet, a lifting apron movable in said casing adjacent said outlet, mechanism for conveying slabs of cotton in a substantially horizontal plane from said inlet into contact with the said apron, a stripper roller at the upper end of said lifting apron, a frame having an endless conveyor mounted thereon to return to said mechanism slabs of cotton removed from said apron by said stripper roller, means for mounting said frame for bodily adjustment toward and from said apron and for angular adjustment relative to said mechanism, and means for locking said frame in adjusted position in said casing.

NELSON B. HENRY.